United States Patent [19]

Dunn et al.

[11] Patent Number: 5,489,442
[45] Date of Patent: Feb. 6, 1996

[54] PROLONGATION OF SHELF-LIFE IN PERISHABLE FOOD PRODUCTS

[75] Inventors: Joseph E. Dunn, Vista, Calif.; Thomas M. Ott, Westwood, N.J.; Reginald W. Clark, Del Mar, Calif.

[73] Assignee: Purepulse Technologies, Inc., San Diego, Calif.

[21] Appl. No.: 228,608

[22] Filed: Apr. 18, 1994

[51] Int. Cl.$^6$ ............................... A23L 3/00; A61L 2/00
[52] U.S. Cl. ............................ 426/248; 99/451; 422/24; 426/305; 426/521
[58] Field of Search .................................. 426/237, 248, 426/305, 310, 521; 422/24; 99/451

[56] References Cited

U.S. PATENT DOCUMENTS

| | | | |
|---|---|---|---|
| 2,438,168 | 3/1948 | Hearst et al. | 99/170 |
| 4,112,124 | 9/1978 | Jarvis | 426/234 |
| 4,321,232 | 3/1982 | Bithell | 422/23 |
| 4,842,880 | 6/1989 | Creason et al. | 426/310 |
| 4,871,559 | 10/1989 | Dunn et al. | 426/248 |

FOREIGN PATENT DOCUMENTS 364128  12/1931  United Kingdom.

OTHER PUBLICATIONS

Baldwin, "Chapter X. Edible Coatings for Fresh Fruits and Vegetables: Past, Present and Future"; *USDA/ARS Citrus & Subtropical Products Laboratory*, Winter Haven, Florida, pp. 2–57.

Hardenburg, et al., "The Commercial Storage of Fruits, Vegetables, and Florist and Nursery Stocks", *United States Department of Agriculture Handbook* No. 66, pp. 23≧24.

Kester, et al., "Edible Films and Coatings: A Review", *Food Technology*, 40:12, pp. 47–49 (Dec. 1986).

*Primary Examiner*—George Yeung
*Attorney, Agent, or Firm*—Fitch, Even, Tabin & Flannery

[57] ABSTRACT

A method for prolonging the shelf-life of perishable food products includes applying a fluid coating to a surface of the food product. The fluid coating adheres to the surface and forms a solid coating that covers the surface. The solid coating is preferably an edible coating and is at least partially transparent to light having a frequency within a prescribed frequency range, and the solid coating reduces the accessibility of the surface of the food product to microorganisms. Next, the solid coating is illuminated with light within the prescribed frequency range. At least a portion of the light passes through the solid coating and deactivates microorganisms at and near the surface of the food product thereby increasing the shelf-life of the food product. An apparatus for carrying out the above method has an application device that applies the fluid coating material to the surface; a light source that illuminates the solid coating with light; and a energizing device that energizes the light source.

23 Claims, 2 Drawing Sheets

PROLONGATION OF SHELF-LIFE IN PERISHABLE FOOD PRODUCTS

BACKGROUND OF THE INVENTION

The present invention relates to the preservation of a solid food product, and more particularly to the prolongation of the shelf-life of such food product. Even more particularly, the present invention relates to the deactivation of microorganisms on a surface of the food product and the prevention of reinfection of the food product by such microorganisms.

Fresh fruits, vegetables, and other food products, for example, strawberries, accumulate microorganisms, which as used herein includes bacteria, viruses, and fungi, from the air, ground, water and other sources with which they come into contact. These microorganisms, through various known mechanisms, cause the perishable food products to spoil, thereby significantly limiting the shelf-life of the food products. (Shelf-life is the period of time during which the perishable food product can be stored refrigerated or unrefrigerated, and remain edible and free from noticeable or harmful degradation or contamination by microorganisms.) As a result, methods and apparatuses suitable for deactivating, i.e., killing or sterilizing, such microorganisms and thereby extending the shelf-life of perishable foods, such as strawberries, oranges, tomatoes, zucchini, apples, and other edible food products, are desirable.

The photobiological effects of light, including infrared light (780 nm to 2600 nm; i.e., $3.9 \times 10^{14}$ Hz to $1.2 \times 10^{14}$ Hz), visible light (380 to 780 nm; i.e., $7.9 \times 10^{14}$ Hz to $3.9 \times 10^{14}$ Hz), near ultraviolet light (300 to 380 nm; i.e., $1.0 \times 10^{15}$ Hz to $7.9 \times 10^{14}$ Hz) and far ultraviolet light (170 to 300 nm; i.e., $1.8 \times 10^{15}$ Hz to $1.0 \times 10^{15}$ Hz), have been studied, and efforts have been made to employ light to deactivate microorganisms on food products or containers for food products. See, e.g., U.S. Pat. No. 4,871,559, issued to Dunn et al. (the '559 patent), incorporated herein by reference. One significant problem, however, with apparatuses and methods that merely use light to deactivate microorganisms is the problem of reinfection. This problem arises because foods, particularly fruits and vegetables, are generally shipped in bulk containers and are therefore subjected to airborne microorganisms.

Significant effort has been directed to aseptic packaging technology for packaging of sterilized food products in sterile packaging materials in order to provide preserved foodstuffs that are not readily reinfected with microorganisms. However, such methods and apparatuses have various disadvantages such as requiring that the food products, e.g., fresh fruit, be packaged so as to prevent cross contamination.

One example of an aseptic packaging system in combination with a photobiological food treatment apparatus is shown in the '559 patent. Short pulses of incoherent, broad spectrum light are used to preserve food products against microbial degradative processes. As a result, the teachings of the '559 patent provide significant shelf-life and stability enhancements to the food product. Application of pulses of high intensity, incoherent polychromatic light provides efficient, effective, high throughput processing and results in many practical and economic advantages. Moreover, the short duration and the spectral range of each pulse permits spatial localization of various of the preservative effects of the light pulses to a thin surface layer such as the surface of the food product or packaging material.

Problematically, however, the apparatus of the '559 patent uses an individual package for each of the food products it processes, or for small groups of such food products. In the later case, the food products are susceptible to cross contamination. Such packaging is relatively costly for use with fruits and vegetables, which are typically shipped in nonairtight boxes without individual packaging; does not conform to industry conventions for shipment of fruits and vegetables; requires the use of complex packaging apparatuses; and results in unwanted packaging waste for the consumer of such fruits and vegetables. Thus, what is needed is a low cost, simplified apparatus and method for deactivating microorganisms and for extending their shelf-life that does not require the use of complex or expensive packaging, gas mixtures, etc., and that does not require modification of conventional shipping practices used in the fruit and vegetable industry.

Another attempt to prolong the shelf-life of perishable food products consists of the application of microbiocides and/or microbiostats to the surface of the perishable food products. As used herein, the terms microbiocide and microbiostat include substances for killing or preventing the growth/reproduction of microorganisms (as the term microorganisms is defined herein). One example of microbiocides are chemical fungicides. Generally, the microbiocide and/or microbiostat is combined with an emulsifying agent and is then applied to the surface of the food product. The emulsifying agent aids in the application and action of the microbiocide and/or microbiostat agent, which ensure that the microbiocide and/or microbiostat agent remains on the surface of the food product and deactivates microorganisms during shipping until the food product is consumed.

Problematically, such microbiocides and microbiostats have come under increased scrutiny by various governmental agencies, and in some cases have been shown to be potential human carcinogens. As a result, several microbiocides and microbiostats that were once commonly applied to the surface of food products in order to prolong the shelf-life of the food products have been or could be banned by governmental agencies from use with food products. Therefore, an approach to prolonging the shelf-life of perishable food products, that does not require the use of a microbiocide or a microbiostat, such as a chemical fungicide, is highly desirable.

The present invention advantageously addresses the above and other needs.

SUMMARY OF THE INVENTION

The present invention advantageously addresses the needs above as well as other needs by providing a method and apparatus for deactivating microorganisms on a surface of a food product and for preventing reinfection of the food product by such microorganisms.

The invention can be characterized as a method for prolonging the shelf-life of perishable solid food products, i.e., for preserving such food products. In operation, a fluid or semi-solid (referred to hereinafter as fluid) coating is (a) applied to a surface of the perishable solid food product. The fluid coating adheres to the surface after being applied so as to form a solid or semi-solid (referred to hereinafter as solid) coating that substantially covers or enrobes the surface. The solid coating is preferably an edible coating and is at least partially transparent to light having a frequency within a prescribed frequency range. Furthermore, the solid coating acts as a barrier to reduce the accessibility of the surface of the food product to subsequent (i.e., after the solid coating is applied) microbial reinfection (or reinfestation). The food product with its applied solid coating is (b) illuminated for a period with polychromatic or monochromatic, continuous wave or pulsed light having frequencies within the prescribed frequency range. At least a portion of the light passes through the solid coating and deactivates microorganisms substantially at the surface of the food product. As a result, the light in combination with the solid coating causes the deactivation of microorganisms on the surface of the food product and extension of the shelf-life of the perishable solid food product.

The present invention may also be characterized as an apparatus including: (1) an application device that applies a fluid coating material to a surface of the perishable solid food product; (2) a light source that illuminates the solid coating; and (3) a power source that energizes the light source that illuminates the solid coating so as to cause light to illuminate the solid coating.

The fluid coating adheres to the surface after being applied by the application device so as to form a solid coating that substantially enrobes the surface. The solid coating is preferably an edible coating, is at least partially transparent to light having a frequency within a prescribed frequency range and reduces the accessibility of the surface of the perishable solid food product to subsequent microbial reinfection. The light has a frequency within the prescribed frequency range, and at least a portion of the light passes through the solid coating, illuminating the surface of the perishable solid food product and inactivating microorganisms substantially at the surface of the perishable solid food product. As a result, the light in combination with the solid coating cause the preservation of the perishable solid food product.

It is therefore a feature of the invention to prolong the shelf-life of the perishable solid food product.

It is another feature of the invention to achieve such preservation without the need for microbiocides or microbiostats.

It is a further feature of the invention to achieve such preservation without the need for complex packaging.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
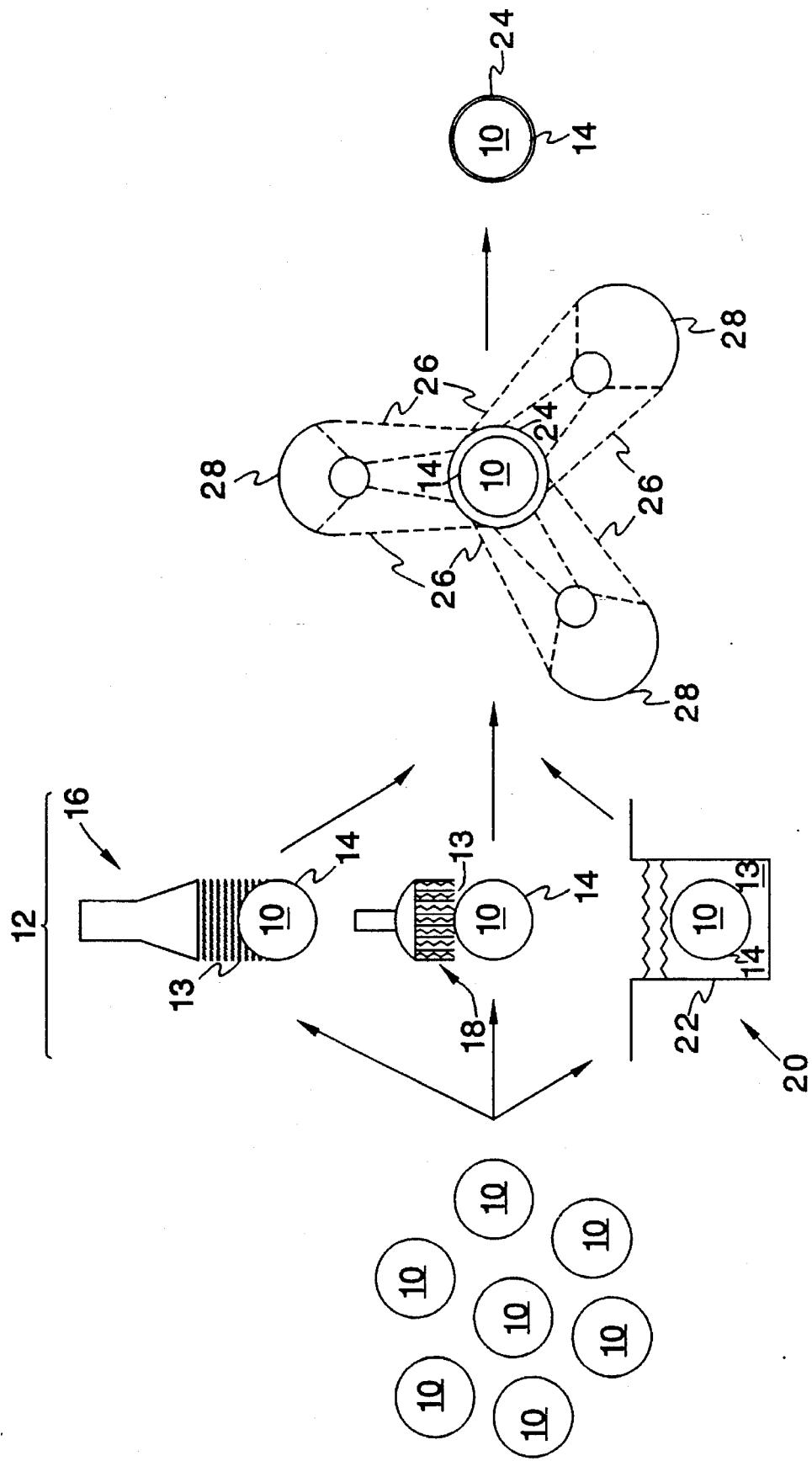
FIG. 1 is a schematic diagram of an apparatus made in accordance with the invention for deactivating microorganisms at the surface of a food product, and for preventing reinfection of the food product.

Referring first to FIG. 1, a schematic diagram is shown of an apparatus made in accordance with the invention for deactivating microorganisms at the surface of a food product, and for preventing reinfection of the food product with such microorganisms.

In operation a food product 10 is passed into a coating apparatus 12, wherein the food product 10 is coated with a microorganism barrier. The microorganism barrier is a liquid or semi-liquid material 13 (hereinafter fluid coating material) that is applied to the outer surface 14 of the food product 10. Such application is achieved by spraying 16 the fluid coating material 13 onto the surface 14 of the food product 10. Alternatively, such application can be achieved by brushing 18 the fluid coating material 13 onto the outer surface 14, or by immersing 20, or dipping, the food product 10 into a bath 22 of the fluid coating material 13. After application of the fluid coating material 13, the fluid coating material 13 solidifies into a solid or semi-solid coating 24 (hereinafter solid coating) that covers the surface 14 of the food product 10. Such solidification can be by drying (evaporation), or by cooling (in the case of a fluid coating material that has been heated before its application or that has been cooled after its application). The solid coating is preferably an edible coating. Next, the food product 10 is exposed to intense (i e., 0.01 to 50 $J/cm^2$, e.g., 0.5 $J/cm^2$, energy density measured at the surface of the solid coating 24), short duration pulses of polychromatic light 26 in a broad spectrum (i.e., 170 to 2600 nm; $1.8 \times 10^{15}$ Hz to $1.2 \times 10^{14}$ Hz). For example, the food product can be exposed to four pulses (or flashes) of the polychromatic light.

Illumination of the entire surface of the food product is preferred and can be achieved by rotating (e.g., using rollers or a shaker apparatus) the food product between two or more flashes of the polychromatic lamp; by dropping the food product within a treatment zone and exposing the food product from all sides as it falls; by moving the food product through the treatment zone on a transparent carrier, e.g., a transparent conveyor belt; or by manually (hand) rotating the food product in the treatment zone.

Note that the light may also include continuous wave and monochromatic or polychromatic light having wavelengths outside the broad spectrum. However, at least 60%, preferably at least 70%, of the energy of the light should be from light having wavelengths within the broad spectrum defined above.

The polychromatic light 26 passes through the solid coating 24 and impinges upon the surface 14 of the food product 10, so as to deactivate microorganisms at or near (i.e., within one millimeter of) the surface 14 of the food product 10. Such exposure deactivates, i.e., kills or sterilizes, substantially all (i.e., more than 50%, e.g., 90%) of the microorganisms on the surface of the food product.

Having been coated with the solid coating 24 before having been exposed to the intense, short duration pulses of polychromatic light 26, the food product 10 is substantially more resistant to reinfection by microorganisms, e.g., airborne spores, fungi, bacteria, etc. than the food product 10 would be without the solid coating 24.

The types of food products 10 to which the invention can be applied are very broad, however, the invention has proven to be particularly useful with fruits and vegetables, such as strawberries, oranges, apples, tomatoes, zucchini, etc.

The solid coating 24, as mentioned above, is applied as the fluid coating material 13. Suitable application techniques include spraying or dipping into water emulsions, foaming, fogging with solutions made with volatile solvents, dripping emulsions onto brushes or brushing the brushes against a semi-liquid cake of the fluid coating material 13. The solid coating 24 should preferably be less than 1 mm, e.g., less than 0.1 mm, thick, depending on the fluid coating material 13/solid coating 24 selected for use in the present invention. The solid coating 24 may be as many as 2 or 3 mm thick, e.g., where there is little or no concern about the appearance or flavor of the food product, e.g., where the food product is to be fed to non-human animals.

The fluid coating material 13/solid coating 24 consists of a wax, such as a water wax, bar or slab wax, paste/oil wax, paraffin wax, carnauba wax, wax emulsions (including colloidal suspensions), beeswax, carbohydrate waxes, and petroleum waxes. Alternatively, the fluid coating material 13/solid coating 24 can consist of a polysaccharide film, including alginate, pectin, carrageenan, starch, starch hydrolysate (dextrins), cellulose derivatives and/or sucrose polyesters/esters; a protein film; a lipid film, including acetoglycerides, waxes, surfactants; or a blend of such films. Shellac, gum, resin and mineral oil can also be utilized alone or in combination with the above-mentioned fluid coating materials 13/solid coatings 24. See Baldwin, "Edible Coatings for Fresh Fruits and Vegetables: Past, present and future," incorporated herein by reference, and Kester, "Edible Films and Coatings: A Review", *Food Technology*, 42:47–59 (1988), also incorporated herein by reference. Suitable fluid coating material 13/solid coating 24 (1) should have light transmission within the broad spectrum of the polychromatic light, (2) should serve as a physical barrier to microorganisms, and (3) should be edible and suitable for consumption by humans or other animals to which the food product will be fed. In an alternative embodiment, note that the fluid coating material 13/solid coating 24 need not be edible, but instead is easily removable through, e.g., washing with water before the food product is to be consumed.

Examples of suitable fluid coating materials 13/solid coatings 24, which are commonly available from a variety of sources, are those fluid coating materials 13/solid coatings 24 available from Solutec Corporation of Yakima, Wash. as Citrus-Brite 210 and APL-Brite 310C; Shield-Brite of Kirkland, Wash. as Shield-Brite ST-400; Fresh Mark Corporation of Ocoee, Fla. as Fresh Wax 625 and Fresh Wax 51 V; and American Machinery Corporation of Orlando, Fla. as PAC-RITE 425 and PACRITE Tropical Fruit Coating 213. The above-mentioned fluid coating materials 13/solid coatings 24 from Fresh Mark Corporation of Ocoee, Fla. are preferred coatings for use with the present invention. The Fresh Wax 625 fluid coating material 13/solid coating 24 includes an emulsion of oxidized polyethylene, emulsifiers, stabilizers, spreaders and preservatives. The Fresh Wax 51 V fluid coating material 13/solid coating 24 includes white oil paraffin wax, petroleum and oleic acid. Both of the preferred coatings currently are registered with the United States Food and Drug Administration.

Demonstration of the preferred coatings is made by conducting several transmission/kill tests using several fluid coating materials 13/solid coatings 24, such as those listed above. In order to conduct such tests, an overnight tryptic soy broth 30C shake culture of *Escherichia coli* ATCC 26 is prepared and plated as a series of 25 μl microdrops on a surface of standard plate count agar plates. The microdrops are plated using undiluted stock culture and a series of serial ten-fold saline dilutions. Each inoculated plate contains seven distinct microdrops. Each of the seven distinct microdrops contains a different concentration of microorganism density in 1 log increments over a 7 log range of microorganism densities. The microdrops are dried at room temperature for approximately ten minutes. A separate plate is prepared for each of the fluid coating materials 13/solid coatings 24 to be tested and for a control plate, and the plates are used to test the potential of the polychromatic light to deactivate microorganism as follows.

A quartz microscope slide is dipped in the fluid coating material, e.g., one of the exemplary fluid coating materials/solid coatings listed above, so that both sides of the slide are coated with the fluid coating material. The fluid coating material solidifies on the slide into the solid coating material, and the slide is mounted onto an aluminum foil mask. The aluminum foil mask blocks the light so that only light that passes through the solid coating and the slide can reach the microorganisms. Four flashes of the polychromatic light, having an energy density of 0.5 $J/cm^2$ each (measured at the surface of the solid coating that is on the slide) and having a duration of about 0.3 ms each and a repetition rate of 1 pulse/s, are applied to the solid coating covered slide. At least a portion of the polychromatic light incident on the solid coating and slide, passes through the solid coating and slide and illuminates the microdrops. The level of deactivation of microorganisms is determined by comparing a growth pattern on an untreated (or control) plate and on a plate treated with the light as described above. A "log reduction" is determined as the highest log number within the 7 log range, of microorganizms within a droplet showing growth on the control plate, but no surviving microorganisms on plates that are illuminated with the polychromatic light.

Exposure of the food product 10 to the intense, short duration pulses of broad spectrum polychromatic light 20 (i.e., polychromatic light having a wavelength between 170 to 2600 nm, i.e., $1.8\times10^{15}$ Hz to $1.2\times10^{14}$ Hz) is described by Dunn et al. in U.S. Pat. No. 4,871,559, previously incorporated herein by reference. Such exposure is achieved using a flashlamp system 28, such as PUREBRIGHT Model No. PL-320 available from FoodCo Corp. of San Diego, Calif. The flashlamp system includes a pulsing device that includes a DC power supply that charges energy storage capacitors; a switch used to discharge the capacitors; a trigger circuit used to fire the switch at pre-programmed time intervals, in response to sensors that detect the position of the food product to be treated, or in response to a button being depressed; and a set of high voltage coaxial cables carrying the discharge pulses from a capacitor-switch assembly to a flashlamp assembly. The flashlamp assembly includes from one to four flashlamps mounted in metal reflectors so as to direct the polychromatic light 26 emitted from the flashlamps toward the food product.

One alternative system 28 utilizes a lamp that continuously generates the light 26. The lamp is mounted within a shutter assembly, wherein a shutter opens for brief periods of time so as to expose the food product to pulses of light 26. An additional alternative light system 28 utilizes a monochromatic light source, e.g., laser sources, that either pulses or continuously generates monochromatic light (not shown).

As a further alternative, the polychromatic lamp or the monochromatic source (that generates either coherent or incoherent monochromatic light) may be used to apply the polychromatic light 26, or the monochromatic light, respectively, for extended periods of time, i.e., for periods lasting more than one second, e.g., ten seconds or several minutes. The light of this alternative may be either the broad spectrum polychromatic light of the preferred embodiment, or may be a narrower band of polychromatic light within the broad spectrum defined above. At least 70% of the energy from the source is from light having a frequency that is within the above-defined broad spectrum.

The pulses of polychromatic light 26 are preferably from between 0.001 ms to 100 ms, e.g., 0.3 ms, in duration and have a pulse repetition rate of from one to 100 pulses, e.g., 10 pulses, per second.

After the food product 10 has been coated with the solid coating 24, as described above, and exposed to the polychromatic light 26 from the flashlamp system 28, the food product 10 is resistant to recontamination by microorganisms, e.g., air-borne microorganisms, that typically infest such food products 10. Because the solid coating 24 is substantially transparent to the visible and near-visible polychromatic light 26, the polychromatic light 26 passes through the solid coating 24 and impinges upon the surface 14 of the food product 10. Microorganisms present at the surface 14 of the food product 10, beneath solid coating 24, are, as a result, exposed to the visible and near visible polychromatic light 26. Such exposure causes the deactivation of the microorganisms. In this way, significant enhancement of the shelf-life of the food product 10 is achieved by the present invention.

EXAMPLE

Figure 2:
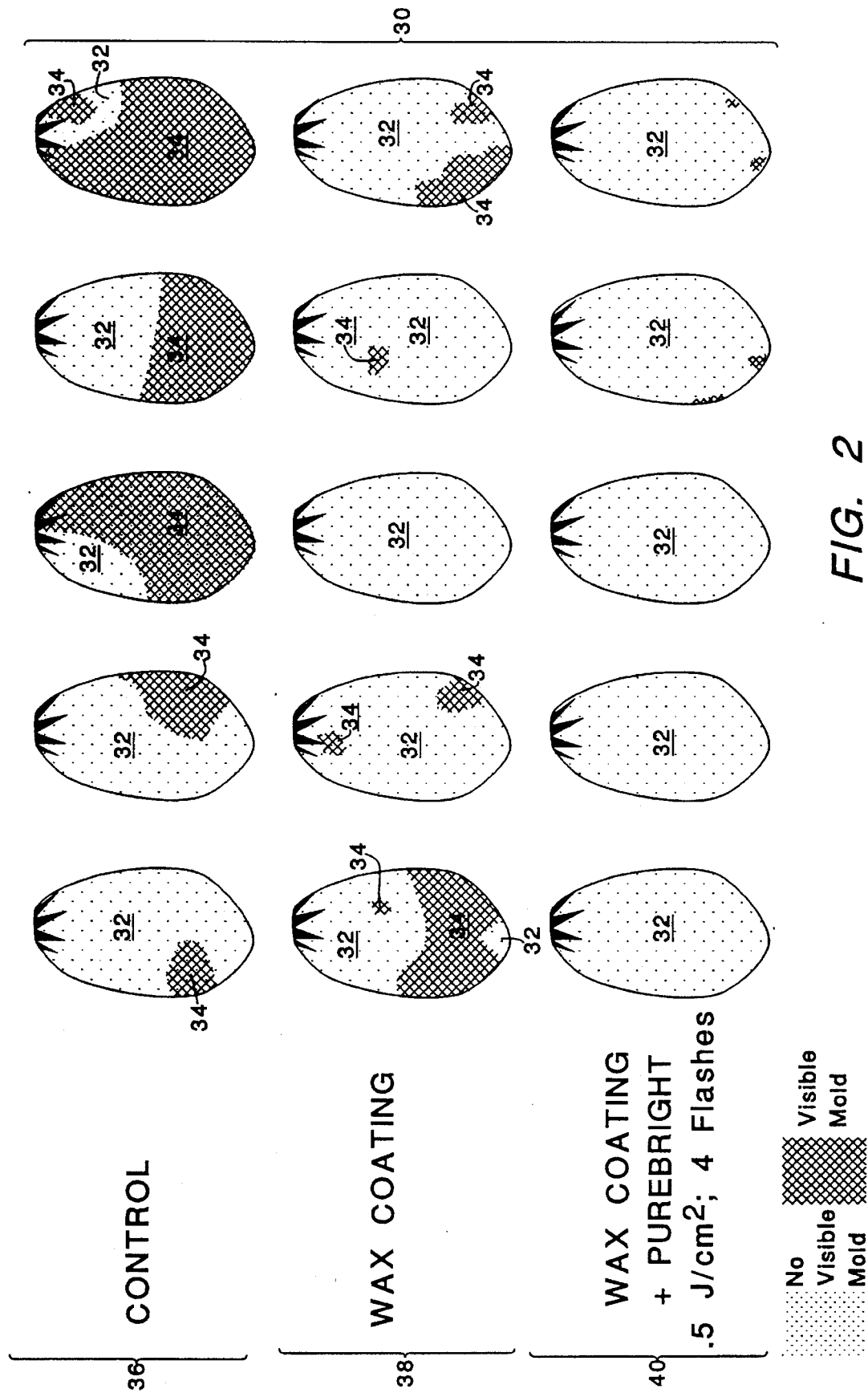
FIG. 2 is a comparative representation of the food product after having been stored at room temperature for approximately two weeks.

Referring next to FIG. 2, a comparative representation is shown of the food product 10 (in this case strawberries 30) after having been stored at room temperature for approximately two weeks.

Three groups of five strawberries 30 are purchased off-the-shelf, treated as described below and stored in three separate covered, but not air-tight, cardboard boxes that are exposed to ambient air and temperature for approximately two weeks.

A control group 36 is not treated or coated prior to being placed into a first of the three cardboard boxes. After the approximately two weeks of storage, the control group 36 is removed from the first cardboard box, and, as shown in FIG. 2, dotted areas of the strawberries 30 indicate areas where no visible contamination 32 (e.g., mold) can be seen after the storage, and cross-hatched areas indicate areas where noticeable contamination 34 can be seen after the storage. Thus it is apparent that the control group 36 is highly contaminated after the storage.

A second group 38 is coated with the solid coating 24, in this case the Shield-Bright coating mentioned above, and is placed into a second of the cardboard boxes. The coating is achieved by dipping the strawberries into the Shield-Bright coating, and allowing the Shield-Bright coating to solidify on the surface of the strawberries into the solid coating 24. Such solidification is caused by the drying of the Shield-Bright coating. After the approximately two weeks of storage the second group 38 is removed from the second cardboard box, and, as can be seen, significantly less contamination 34 is visible on the strawberries of the second group 38 than those of the control group 36. This reduction in contamination 34 is attributable, at least in part, to the protection the solid coating 24 provides against reinfection or recontamination of the strawberries by airborne microorganisms. Thus, the contamination 34 that is visible is largely due to microorganisms that are present at the surface of the strawberries 30 at the time the solid coating is applied.

A third group 40 is coated with the solid coating 24 and is exposed to four pulses (or flashes) of the polychromatic light 26 having 0.5 J/cm$^2$ energy density (measured at the surface of the solid coating 24). The coating is achieved as described above, and the pulses are about 0.3 ms in duration and have a repetition rate of 1 pulse/s. The strawberries of the third group 40 are then placed into a third of the three cardboard boxes, and after the approximately two weeks, the strawberries of the third group are removed. As can be seen, almost zero contamination 34 is visible on the strawberries 30 of the third group 40. This surprising reduction in contamination 34 illustrates the advantages of the present invention.

Thus, the present invention provides for a significant reduction in the amount of contamination 34 visible on the surface of the strawberries 30 and other food products after approximately two weeks exposure to ambient air and temperature. Therefore, the present invention provides for a significant increase in shelf-life for the strawberries 30 and other food products.

While the invention herein disclosed has been described by means of specific embodiments and applications thereof, numerous modifications and variations could be made thereto by those skilled in the art without departing from the scope of the invention set forth in the claims.

What is claimed is:

1. A method for increasing shelf-life of a perishable solid food product, including:

applying a fluid coating to a surface of the perishable solid food product, the fluid coating adhering to the surface after the applying of the fluid coating so as to form a solid coating that substantially covers the surface, the solid coating being at least partially transparent to light having a frequency within a prescribed frequency range and reducing the accessibility of the surface of the food product to microorganisms; and illuminating the solid coating with light having frequencies within the prescribed frequency range, at least a portion of the light passing through the solid coating and deactivating microorganisms substantially at the surface of the food product;

whereby the at least a portion of the light in combination with the solid coating cause the increase in shelf-life of the perishable solid food product.

2. The method of claim 1 wherein said illuminating includes illuminating said solid coating with said light, said light including a first pulse of polychromatic light.

3. The method of claim 2 wherein said applying includes applying said fluid coating that solidifies into said solid coating, wherein said solid coating includes a wax.

4. The method of claim 2 wherein said applying includes applying said fluid coating that solidifies into said solid coating, wherein said solid coating does not include a microbiocide and said solid coating does not include a microbiostat.

5. The method of claim 2 wherein said applying includes at least one application method selected from the group of application methods consisting of spraying said fluid coating onto said perishable solid food product, brushing said fluid coating onto said perishable solid food product and dipping said perishable solid food product into a bath of said fluid coating.

6. The method of claim 2 wherein said illuminating includes illuminating with said first pulse of polychromatic light, said polychromatic light having wavelengths between 170 nm and 2600 nm, and having an energy density between 0.01 J/cm$^2$ and 50 J/cm$^2$ at the solid coating.

7. The method of claim 6 including illuminating said solid coating with a second pulse of polychromatic light, the second pulse of polychromatic light having frequencies within said prescribed frequency range, at least a portion of the second pulse of polychromatic light passing through said solid coating and deactivating microorganisms substantially at said surface of said perishable solid food product.

8. The method of claim 7 including illuminating said solid coating with said second pulse of polychromatic light, said second pulse of polychromatic light following said first pulse of polychromatic light by no more than ten seconds and no less than one one-thousandth of one second.

9. An apparatus for increasing the shelf-life of a perishable solid food product, including:

means for applying a fluid coating material to a surface of the perishable solid food product, the fluid coating including means for adhering to the surface after the applying of the fluid coating and for forming a solid coating that substantially covers the surface, the solid coating being at least partially transparent to light having a frequency within a prescribed frequency range and including means for reducing the accessibility of the surface of the perishable solid food product to microorganisms; and means for illuminating the surface of the perishable solid food product with light having a frequency within the prescribed frequency range, including means for passing at least a portion of the light through the solid coating and for deactivating microorganisms substantially at the surface of the perishable solid food product;

whereby the at least a portion of the light in combination with the solid coating causes the increase in shelf-life of the perishable solid food product.

10. The apparatus of claim 9 wherein said light comprises a first pulse of polychromatic light.

11. The apparatus of claim 10 wherein said fluid coating includes solidifying means for solidifying into said solid coating and wherein said solid coating includes a wax.

12. The apparatus of claim 10 wherein said solid coating does not include a microbiocide and wherein said solid coating does not include a microbiostat.

13. The apparatus of claim 10 wherein said applying means includes at least one applicator selected from the group of applicators consisting of sprayer means for spraying said fluid coating onto said perishable solid food product, brush means for brushing said fluid coating onto said perishable solid food product and dip means for dipping said perishable solid food product into said fluid coating.

14. The apparatus of claim 10 wherein said first pulse of polychromatic light has wavelengths between 170 nm and 2600 nm, and has an energy density between 0.01 J/cm$^2$ and 50 J/cm$^2$ at the solid coating.

15. The apparatus of claim 10 wherein said means for illuminating with said first pulse of polychromatic light includes means for illuminating with a second pulse of polychromatic light said surface of said perishable solid food product, the second pulse of polychromatic light having frequencies within said prescribed frequency range, at least a portion of the second pulse of polychromatic light passing through said solid coating and deactivating microorganisms substantially at said surface of said perishable solid food product.

16. The apparatus of claim 15 wherein said means for illuminating includes means for illuminating with said second pulse of polychromatic light following said first pulse of polychromatic light by no more than ten seconds and no less than one one-thousandth of one second.

17. An apparatus for increasing shelf-life of and preserving a perishable solid food product, including:

an application device that applies a fluid coating material to a surface of the perishable solid food product, the fluid coating including means for adhering to the surface after the fluid coating is applied, and means for forming a solid coating that substantially covers the surface, the solid coating being at least partially transparent to light having a frequency within a prescribed frequency range and including means for reducing the accessibility of the surface of the perishable solid food product to microorganisms;

a light source that illuminates the solid coating with light having frequencies within the prescribed frequency range; and an energizing device that energizes the light source that illuminates the solid coating so as to cause light to illuminate the solid coating, the light source including means for passing light through the solid coating, for illuminating the surface of the perishable solid food product with light and for inactivating microorganisms substantially at the surface of the perishable solid food product with light;

whereby the at least a portion of the light in combination with the solid coating causes the increase in the shelf-life and the preservation of the perishable solid food product.

18. The apparatus of claim 17 wherein:

said energizing device is a pulsing device that pulses said light so as to cause a first pulse of said light to illuminate said solid coating.

19. The apparatus of claim 18 wherein said fluid coating includes means for solidifying into said solid coating and wherein said solid coating includes a wax.

20. The apparatus of claim 18 wherein said solid coating does not include a microbiocide and wherein said solid coating does not include a microbiostat.

21. The apparatus of claim 18 wherein said application device includes an applicator from the group of applicators consisting of sprayer means for spraying said fluid coating onto said perishable solid food product, brush means for brushing said fluid coating onto said perishable solid food product and dip means for dipping said perishable solid food product into said fluid coating 22. A method for inactivating microorganisms on the surface of a solid food product and for preventing reinfection of the solid food product by such microorganisms, including:

applying a fluid coating to a surface of the solid food product, the fluid coating solidifying on the surface and adhering to the surface after the applying of the fluid coating so as to form a solid coating that substantially covers the surface, the solid coating being at least partially transparent to light having a frequency within a prescribed frequency range and reducing the accessibility of the surface of the food product to the microorganisms; said solid coating not including a microbiocide and said solid coating not including a microbiostat; and illuminating the solid coating with polychromatic light, the polychromatic light having an energy density of between 0.01 J/cm$^2$ and 50 J/cm$^2$ at the solid coating and a frequency within the prescribed frequency range, the prescribed frequency range being between $1.8 \times 10^{15}$ Hz and $1.2 \times 10^{14}$ Hz, at least a portion of the polychromatic light passing through the solid coating so as to illuminate the surface of the solid food product and causing the deactivating of the microorganisms;

whereby the at least a portion of the polychromatic light in combination with the solid coating causes the deactivation of the microorganisms on the surface of the solid food product and substantially prevents reinfection of the solid food product by such microorganisms.

23. A method for increasing shelf-life in a perishable solid food product, including:

applying a fluid coating to a surface of the perishable solid food product, the fluid coating adhering to the surface after the applying of the fluid coating so as to form a solid coating that substantially covers the surface, the solid coating being at least partially transparent to light having a prescribed frequency and reducing the accessibility of the surface of the food product to microorganisms; and illuminating the solid coating with monochromatic light, seventy percent of the energy from the monochromatic light being from light of the prescribed frequency, at least a portion of the monochromatic light passing through the solid coating and deactivating microorganisms substantially at the surface of the food product;

whereby the at least a portion of the monochromatic light in combination with the solid coating cause the increase in shelf-life of the perishable solid food product.

* * * * *